United States Patent
Cakmakci et al.

(10) Patent No.: US 9,335,549 B2
(45) Date of Patent: May 10, 2016

(54) IMAGING LIGHTGUIDE WITH HOLOGRAPHIC BOUNDARIES

(71) Applicant: Google Inc., Mountain View, CA (US)

(72) Inventors: Ozan Cakmakci, Sunnyvale, CA (US);
Anurag Gupta, San Jose, CA (US);
Mark B. Spitzer, Sharon, MA (US);
Evan M. Richards, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 72 days.

(21) Appl. No.: 14/219,316

(22) Filed: Mar. 19, 2014

(65) Prior Publication Data

US 2015/0268467 A1  Sep. 24, 2015

(51) Int. Cl.
*G03H 1/00* (2006.01)
*G02B 27/01* (2006.01)
*G03H 1/02* (2006.01)
*G03H 1/26* (2006.01)
*G02B 5/02* (2006.01)
*G03H 1/22* (2006.01)

(52) U.S. Cl.
CPC .......... *G02B 27/0172* (2013.01); *G03H 1/0248* (2013.01); *G03H 1/26* (2013.01); *G02B 5/0252* (2013.01); *G02B 27/01* (2013.01); *G02B 27/0103* (2013.01); *G02B 2027/0174* (2013.01); *G02B 2027/0178* (2013.01); *G02B 2027/0196* (2013.01); *G03H 2001/2226* (2013.01); *G03H 2001/2615* (2013.01)

(58) Field of Classification Search
CPC .......... G02B 27/0103; G02B 27/0172; G02B 5/0252; G02B 2027/0174; G02B 27/017; G02B 2027/0112; G02B 6/00; G02B 2027/014; G02B 2027/0178; G02B 27/0944; G02B 27/22; G02B 6/0035; G02B 17/004; G02B 27/01; G02B 2027/0194–2027/0196
USPC ........ 359/13, 14, 15, 19, 22, 34, 35, 630–639
See application file for complete search history.

(56) References Cited

U.S. PATENT DOCUMENTS

| | | |
|---|---|---|
| 5,071,210 A | 12/1991 | Arnold et al. |
| 7,898,502 B2 | 3/2011 | Tanijiri et al. |
| 8,639,072 B2 | 1/2014 | Popovich et al. |

(Continued)

OTHER PUBLICATIONS

Cakmakci, O. et al., "Head-Worn Displays: A Review," Journal of Display Technology, vol. 2, No. 3, Sep. 2006, pp. 199-216, IEEE.

(Continued)

*Primary Examiner* — Scott J Sugarman
*Assistant Examiner* — Alberto Betancourt
(74) *Attorney, Agent, or Firm* — Blakely Sokoloff Taylor & Zafman LLP (57) ABSTRACT

An optical element for a Head Mounted Display ("HMD") includes a lightguide. The lightguide is embedded in the optical element and optically coupled to receive display light and direct the display light in an eyeward direction. The lightguide includes an eyeward hologram, a scene-side hologram, and a propagation region disposed between the eyeward hologram and the scene-side hologram. The eyeward hologram is configured to reflect a wavelength range of the display light that is incident upon the eyeward hologram at a specific angle. The scene-side hologram is configured to reflect the wavelength range of the display light that is incident upon the scene-side hologram at the specific angle.

19 Claims, 5 Drawing Sheets

(56) References Cited

U.S. PATENT DOCUMENTS

| | | | |
|---|---|---|---|
| 2007/0188837 A1* | 8/2007 | Shimizu et al. | 359/13 |
| 2008/0025667 A1* | 1/2008 | Amitai | 385/36 |
| 2009/0067057 A1 | 3/2009 | Sprague et al. | |
| 2011/0241975 A1* | 10/2011 | Mukawa et al. | 345/8 |
| 2012/0224149 A1 | 9/2012 | Tominaga et al. | |
| 2012/0293548 A1* | 11/2012 | Perez et al. | 345/633 |
| 2013/0241907 A1 | 9/2013 | Amirparviz et al. | |

OTHER PUBLICATIONS

Akagi, M. et al., "Electron micrographs of hologram cross sections," Applied Physics Letters, vol. 21, No. 3, Aug. 1, 1972, pp. 93-95, AIP Publishing.

Goodman, J. W., "Introduction to Fourier Optics: Second Edition," Copyright © 1996, 1968 by The McGraw-Hill Companies, Inc., 457 pages.

* cited by examiner

IMAGING LIGHTGUIDE WITH HOLOGRAPHIC BOUNDARIES

TECHNICAL FIELD

This disclosure relates generally to optics and in particular but not exclusively, relates to a holographic lightguide for a Head Mounted Display ("HMD").

BACKGROUND INFORMATION

A head mounted display ("HMD") is a display device worn on or about the head. HMDs usually incorporate some sort of near-to-eye optical system to emit a light image within a few centimeters of the human eye. Single eye displays are referred to as monocular HMDs while dual eye displays are referred to as binocular HMDs. Some HMDs display only a computer generated image ("CGI"), while other types of HMDs are capable of superimposing CGI over a real-world view. This latter type of HMD can serve as the hardware platform for realizing augmented reality. With augmented reality, the viewer's image of the world is augmented with an overlaying CGI, also referred to as a heads-up display ("HUD").

HMDs have numerous practical and leisure applications. Aerospace applications permit a pilot to see vital flight control information without taking their eye off the flight path. Public safety applications include tactical displays of maps and thermal imaging. Other application fields include video games, transportation, and telecommunications. As HMDs get lighter, smaller, and adaptable for a variety of users, the applications for HMD use will increase.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a holographic lightguide for a Head Mounted Display ("HMD") are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
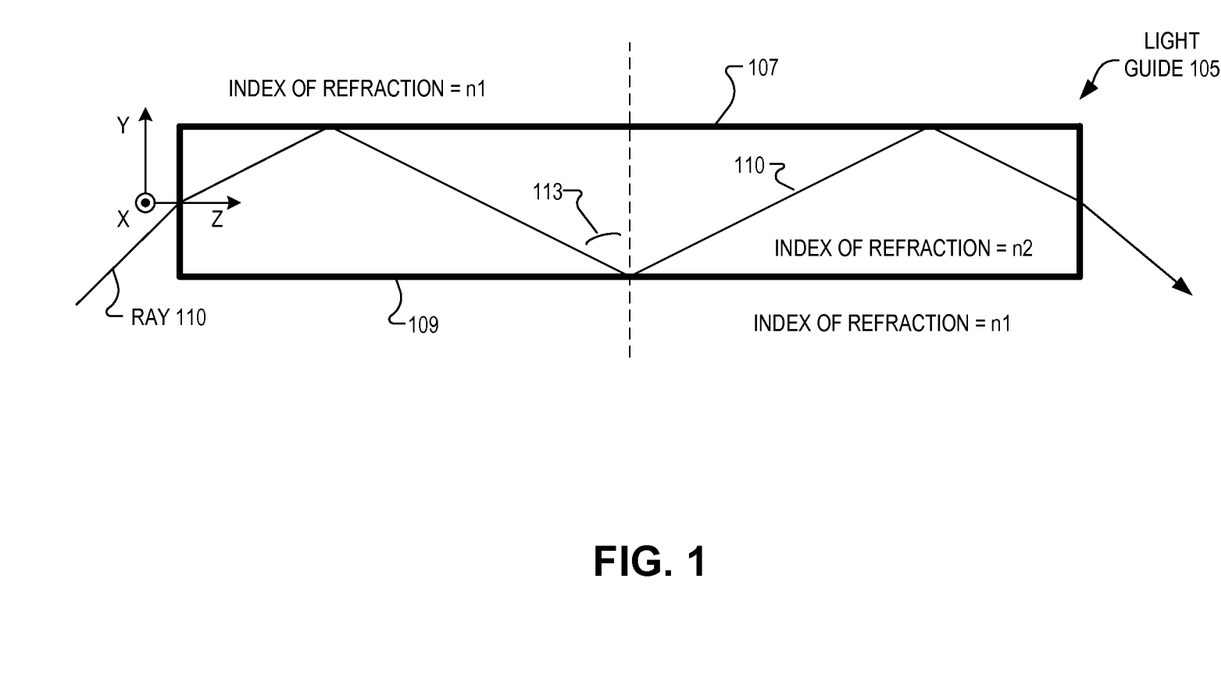
FIG. 1 is a top view of a light ray propagating through a lightguide.

FIG. 1 is a top view of a light ray 110 propagating through a lightguide 105 that includes a front surface 107 and a rear surface 109. Lightguide 105 may be made from optical-grade plastic or glass. Ray 110 propagates along an optical path into light guide 105, reflects off front surface 107, reflects off rear surface 109, reflects off front surface 107 again, and exits lightguide 105. Along the optical path, ray 110 reflects back into lightguide 105 because it encounters the front surface 107 and rear surface 109 at an angle that is greater than an angle of Total Internal Reflection ("TIR"). TIR is a phenomenon that occurs when a propagating wave (e.g. ray 110) strike a medium boundary (e.g. surface 107 or 109) at an angle that is larger than the TIR critical angle, or "critical angle for total internal reflection." The TIR critical angle is given by $\theta=\sin^{-1}(n2/n1)$, where n2 is the index of refraction of the lightguide 105, n1 is the index of refraction of the ambient material (e.g. air having index of refraction of 1), and $\theta$ is the incident angle between the ray and the surface normal inside the lightguide. FIG. 1 illustrates angle 113 as the incident angle that ray 110 encounters rear surface 109. If the incident angle of ray 110 became less than the TIR critical angle of the surface (e.g. surface 107 or 109), a portion of ray 110 will exit lightguide 105 instead of being totally reflected internally and preserving TIR. When n1 becomes larger, the TIR critical angle also increases and consequently, ray 110 will need to have a greater angle of incidence to maintain total reflection as it propagates through lightguide 105.

Figure 2:
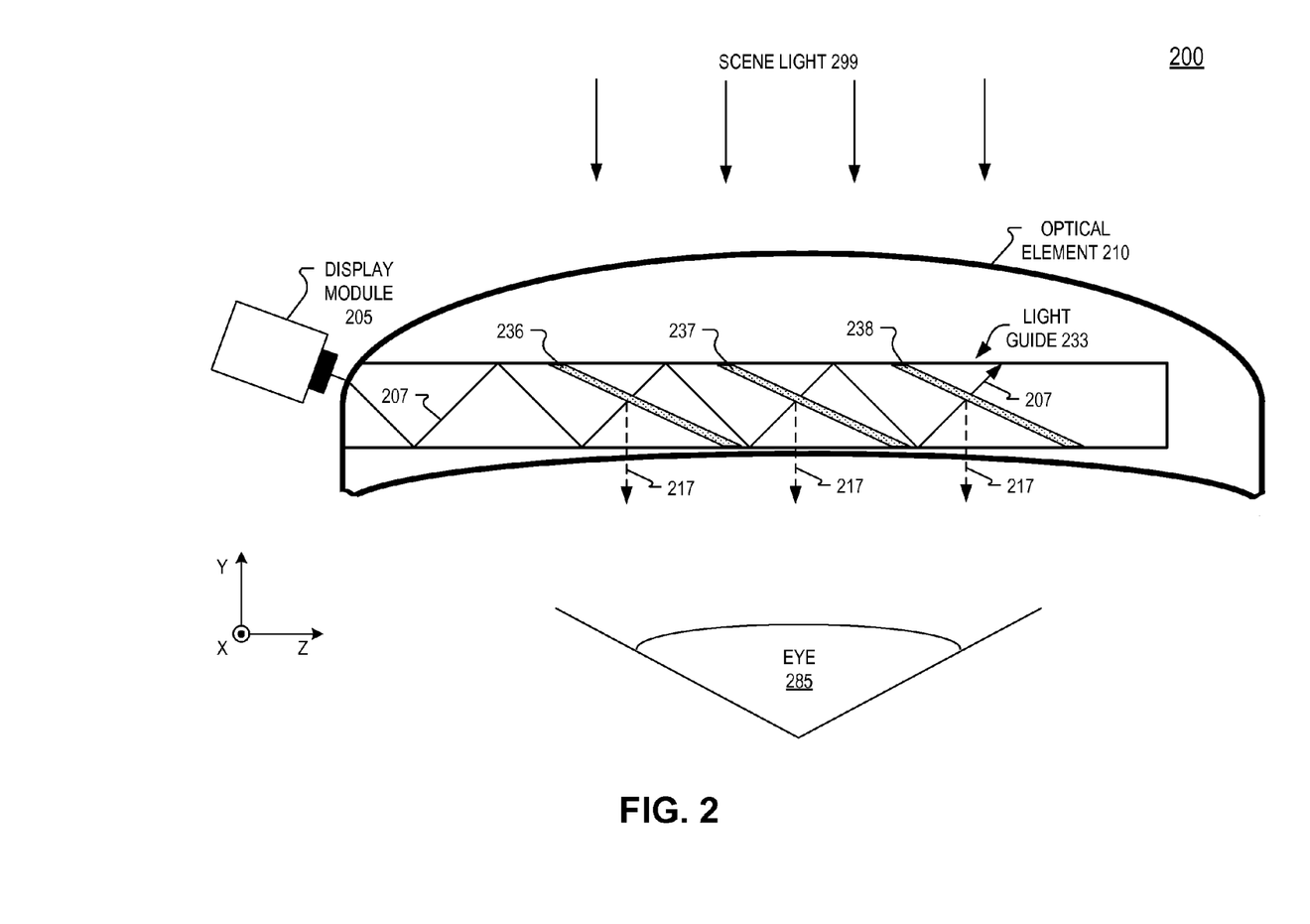
FIG. 2 is an optical system that includes a display module and an optical element having an embedded lightguide coupled to receive display light from the display module and direct the display light in an eyeward direction, in accordance with an embodiment of the disclosure.

FIG. 2 is an optical system 200 that includes a display module 205 and an optical element 210 (e.g. an ophthalmic lens) having an embedded lightguide 233, in accordance with an embodiment of the disclosure. Embedded lightguide 233 is coupled to receive display light 207 from display module 205 and direct display light 207 in an eyeward direction toward eye 285. Lightguide 233 includes outcoupling elements 236, 237, and 238 which are positioned to direct display light 207 in the eyeward direction as outcoupled rays 217. It is understood that rays 207 and 217 are merely example rays and that in operation, many rays will propagate in lightguide 233 in order to deliver an image to eye 285.

Display module 205 may include a variety of compact technologies such as the various micro displays used in pico-projectors, liquid crystal on silicon ("LCOS") displays, backlit liquid crystal displays ("LCD"), organic light emitting diode ("OLED") displays, quantum dot displays, light emitting diode ("LED") arrays, or otherwise and the optics to generate light 207. Display module 205 generates display light 207 which is directed in an eyeward direction via a "folded" optical path that utilizes internal reflection of lightguide 233.

Outcoupling elements 236, 237, and 238 are partially transparent. In one embodiment, each outcoupling element includes a polarizing beam splitter ("PBS"). In FIG. 2, three outcoupling elements (236, 237, and 238) are illustrated. However, it is understood that more or less outcoupling elements may be used. In one embodiment (not illustrated), outcoupling element 238 marks the end of light guide 233. In other words, outcoupling element 238 terminates lightguide 233 and in that embodiment the area in FIG. 2 that is located to the right of outcoupling element 238 comprises the material of optical element 210.

If optical system 200 relies entirely on TIR at the boundary between lightguide 233 and optical element 210 to provide the internal reflection of display light 207 inside of lightguide 233, the optical design of system 200 will be constrained to a limited range of angles of incidence (e.g. angle 113) of display light 207 determined by the ratio of the index of refraction of optical element 210 and the index of refraction of lightguide 233. In some contexts, it is desirable to embed lightguide 233 into an ophthalmic prescription lens. Optical element 210 is illustrated as a prescription lens in FIG. 2. Prescription lenses may have an index of refraction of 1.59 or 1.67, for example. Having an index of refraction of this value significantly limits the range of useful angles if TIR must be relied upon in system 200, and in some cases precludes the use of TIR entirely. It is an object of this invention to overcome the limitations of TIR in embodiments where lightguide 233 is (at least partially) embedded in another material. In one embodiment, lightguide 233 is immersed in a material of similar index of refraction (e.g. optical element 210).

Figure 3A:
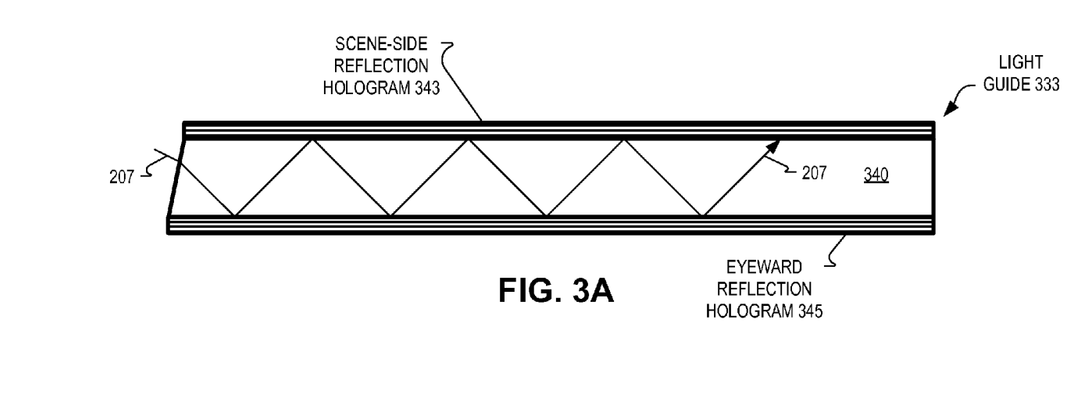
FIGS. 3A and 3B are example holographic lightguides, in accordance with an embodiment of the disclosure.

FIG. 3A shows an example lightguide 333 having a propagation region 340 disposed between a scene-side reflection hologram 343 and an eyeward reflection hologram 345, in accordance with an embodiment of the disclosure. Lightguide 333 is an example lightguide that can be used as lightguide 233. Propagation region 340 may be made from optical-grade plastic or glass. In one embodiment, propagation region 340 has the same index of refraction as optical element 210. Outcoupling elements are not illustrated in FIG. 3A, but outcoupling element(s) similar to outcoupling elements 236-238 may be disposed between reflection hologram 343 and reflection hologram 345 to direct display light 207 in an eyeward direction.

Scene-side reflection hologram 343 and eyeward reflection hologram 345 are made of reflective volume holograms that are wavelength and angle sensitive. In other words, a reflective volume hologram is configured to only reflect specific wavelengths of light when the light (having the specific wavelength) is incident upon the hologram at a specific range of incident angles. Incident light that is not both within a specific wavelength range and within a specific angle range is passed by the reflective volume hologram.

Using conventional techniques, the holograms may be "written" or "recorded" into photoactive holographic mediums (e.g. silver-halide or photopolymer) with a reference beam and an object beam that create interference patterns. When the reference beam and object beam are collimated wavefronts, the interference patterns form a linear, periodic structure (diffraction grating) in the hologram that corresponds with the wavelength selectivity of a given hologram. In cases where the reference beam and object beam are other than collimated wavefronts, the interference pattern is not necessarily linear and periodic. When the hologram is illuminated with a "playback beam," the hologram reflects the wavelength corresponding with the periodic structure written by the interference patterns. The "playback beam" (e.g. light 207) is generally incident on the hologram over a range of angles centered on the angle that the reference beam that recorded the hologram was incident, resulting in the reflection of the playback beam. The end result is that the hologram acts like a mirror with wavelength and angle selectivity when the reference beam and object beams are both normal to the holographic recording media and are propagating in opposite directions. When the beams are outside this condition, the hologram acts like a grating with wavelength and angle selectivity.

The interference patterns may be calculated in software before translating them into the holographic medium. Furthermore, the incident angle and light wavelength ranges that the hologram is configured to reflect may be tuned utilizing known techniques and formulas detailed in Chapter 9 of "Introduction to Fourier Optics." Goodman, Joseph W. *Introduction to Fourier Optics*. Roberts & Company, 2005.

The holographic features in reflection holograms 343 and 345 may be first written to a sheet media, and second, the sheet media can be laminated to propagation region 340 to form lightguide 333. Alternatively, the holographic features may be written in place in an exposable media first placed on material 340, and second by directing the reference beam through propagating region 340, to form the holographic features in the film, and in this way form lightguide 333.

In one embodiment of FIG. 3A, display light 207 is monochromatic and reflection holograms 343 and 345 are configured to reflect the monochromatic wavelength of display light 207 at range of angles at which display light 207 will encounter the respective reflection holograms. In FIG. 3A, display light 207 enters propagation region 340 and encounters eyeward reflection hologram 345 at a range of angles centered approximately a 45° angle relative to the surface normal of eyeward reflection hologram 345. The range of angles may be for example from 35° to 55°. In one example, display light 207 is substantially all between 621 nm and 625 nm and centered around 623 nm. Eyeward reflection hologram 345 is designed to reflect 623 nm light incident at a center angle of 45°, which will, in practice, reflect 621-625 nm light incident at 45° at varying efficiencies depending on angle and wavelength Since eyeward reflection hologram 345 is configured to match both the center angle and center wavelength of display light 207, it reflects almost all of display light 207 back into propagation region 340. After reflecting from eyeward reflection hologram 345, display light 207 encounters scene-side reflection hologram 343 at approximately a 45° center angle relative to the surface normal of scene-side reflection hologram 343. In the example where display light 207 is centered around 623 nm, scene-side reflection hologram 343 is configured to reflect display light 207 similarly to eyeward reflection hologram 345. Since scene-side reflection hologram 343 and eyeward reflection hologram 345 are parallel to each other in FIG. 3A, the incident angles of display light remains approximately constant as display light 207 bounces/reflects down lightguide 333. Since the angles of incidence of display light 207 are preserved, holograms 343 and 345 continue to reflect display light 207 as it propagates through lightguide 333.

Figure 3B:
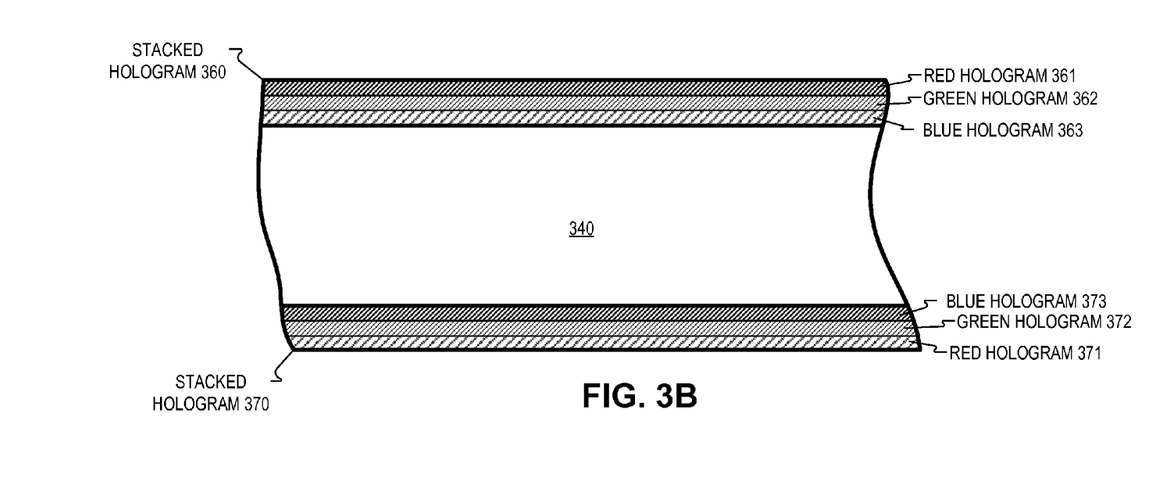

In one example, display light 207 includes three major color components. In one example, a large majority (if not substantially all) of display light 207 is made up of three colors (e.g. red, green, and blue). The three colors may correspond to an illumination source of display module 205. For example, where display module 205 is an LCD or includes an LCOS display, the illumination source may be a red/green/blue ("RGB") LED. If display module 205 includes a backlit LCD, the three colors may correspond to the colors of an RGB LED backlight and/or color filters of the LCD, or if the display module 205 is an OLED, the colors correspond to the three emission wavelength bands of the organic emitter. If display light 207 has three major color components, reflection holograms 343 and 345 are configured to reflect the three colors. In one example, the three color components of display light 207 are 470-475 nm (blue), 520-525 nm (green), and 620-625 nm (red). All three color components may propagate at the same range of angles (e.g. centered on 45°) and reflection holograms 343 and 345 may be configured to reflect the red, green, and blue components of display light 207 when display light 207 is incident at a given angle (e.g. 45°). FIG. 3B includes examples holograms that can be used as reflection holograms 343 and 345 in order to reflect the red, green, and blue components of display light 207.

FIG. 3B shows an example holographic lightguide configuration for reflecting more than one color of display light 207, in accordance with an embodiment of the disclosure. FIG. 3B shows propagation region 340 disposed between stacked hologram 360 and stacked hologram 370. Stacked hologram 360 may be used as scene-side reflection hologram 343 and stacked hologram 370 may be used as eyeward reflection hologram 345.

Stacked hologram 360 includes red hologram 361, green hologram 362, and blue hologram 363. Green hologram 362 is disposed between blue hologram 363 and red hologram 361, in FIG. 3B. Also in FIG. 3B, blue hologram 363 is disposed between green hologram 362 and propagation region 340. Stacked hologram 370 includes red hologram 371, green hologram 372, and blue hologram 373. Green hologram 372 is disposed between blue hologram 373 and red hologram 371, in FIG. 3B. Also in FIG. 3B, blue hologram 373 is disposed between green hologram 372 and propagation region 340.

When stacked holograms 360 and 370 are used as reflection holograms 343 and 345, display light 207 propagates down lightguide 333 and encounters blue hologram 373. Blue hologram 373 is configured to reflect the blue component (e.g. 470-475 nm) of display light 207 at a specific angle range (e.g. 40-50°) and reflects the blue component of display light 207. The non-reflected portions of display light 207 propagate through blue hologram 373 and encounter green hologram 372. Green hologram 372 is configured to reflect the green component (e.g. 520-525 nm) of display light 207 at the same specific angle range (e.g. 40-50°) and reflects the green component of display light 207. The portion of display light 207 that has not been reflected by hologram 373 and 372 propagates through green hologram 372 and encounters red hologram 371. Red hologram 371 is configured to reflect the red component (e.g. 620-625 nm) of display light 207 at the same specific angle range (e.g. 40-50°) and reflects the red component of display light 207.

As discussed, stacked hologram 370 may be configured to reflect a certain wavelength range of display light. In the above example, the wavelength range includes three sub ranges (470-475 nm, 520-525 nm, and 620-625 nm). In other examples, stacked holograms 370 may include more (e.g. 4) or less (e.g. 2) holograms to reflect more or less wavelength sub-ranges, as needed. The wavelengths that the stacked hologram 370 reflects propagate through propagation region 340 toward stacked hologram 360. Stacked hologram 360 is configured similarly to stacked hologram 370 and functions similarly to reflect the different components of display light 207.

Figure 4:
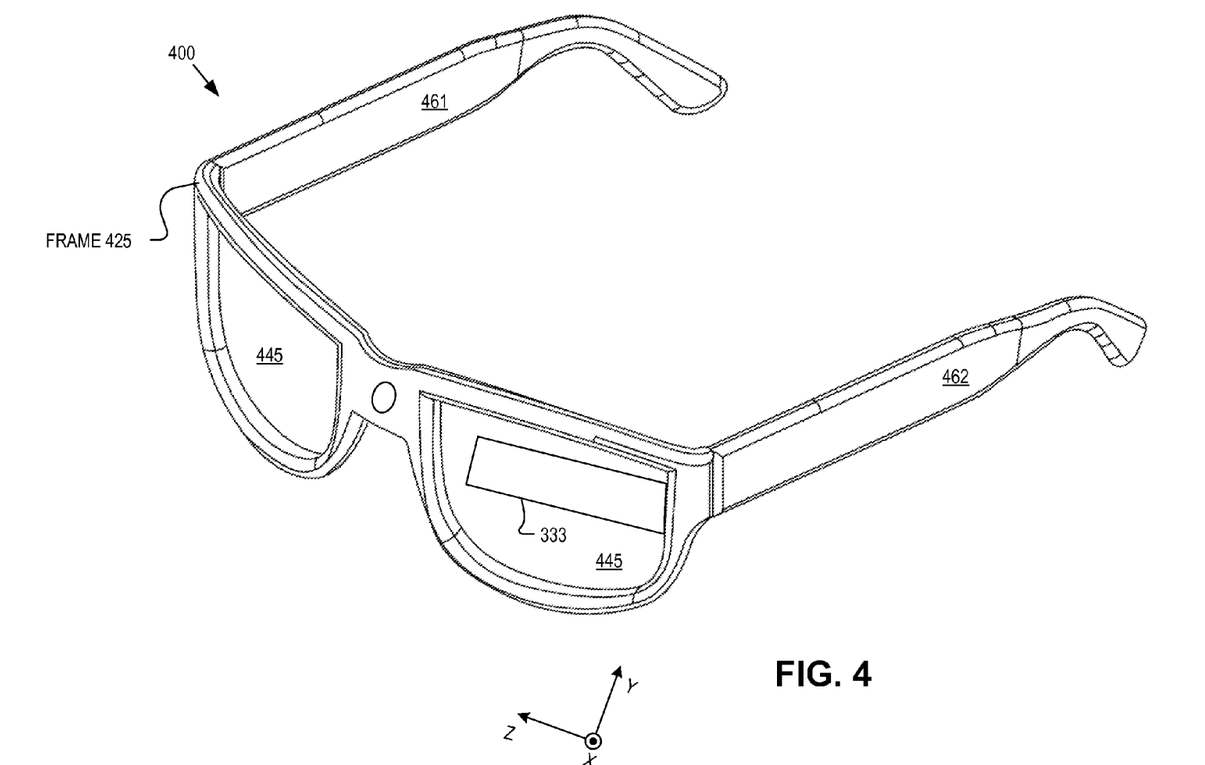
FIG. 4 shows a holographic lightguide embedded in a lens of a Head Mounted Display, in accordance with an embodiment of the disclosure.

FIG. 4 shows lightguide 333 embedded in a lens 445 of an HMD 400, in accordance with an embodiment of the disclosure. In one embodiment, holographic lightguide 333 is completely surrounded by lens 445. HMD 400 has a frame assembly that includes frame 425, right arm 461, and left arm 462. Display module 205 may be disposed in or supported by the frame assembly to emit display light 207 into holographic lightguide 333. The view of holographic lightguide 333 in FIG. 4 shows the front side of scene-side reflection hologram 343. Control logic that controls display module 205 may be disposed within the frame assembly of HMD 400.

The frame assembly positions lenses 445 in front of the eye(s) of a wearer of HMD 400. Lenses 445 are an example of optical element 210. Lenses 445 may have optical power to correct eye sight of a wearer of HMD 400. In FIG. 4, embedded lightguide 333 is embedded in an upper portion of the optical element such that it is out of a straight-ahead line-of-sight of a wearer of HMD 400. In this embodiment, embedded lightguide 333 may be disposed to direct display light 207 toward an eye of a wearer at a downward tilt. In one embodiment, the downward tilt is 7°. Outcoupling elements included in lightguide 333 may be positioned to direct the display light 207 at the downward tilt. Of course, embedded lightguide may be embedded in lens 445 such that it is in the straight-ahead line-of-sight of a wearer of HMD 400.

Figure 5:
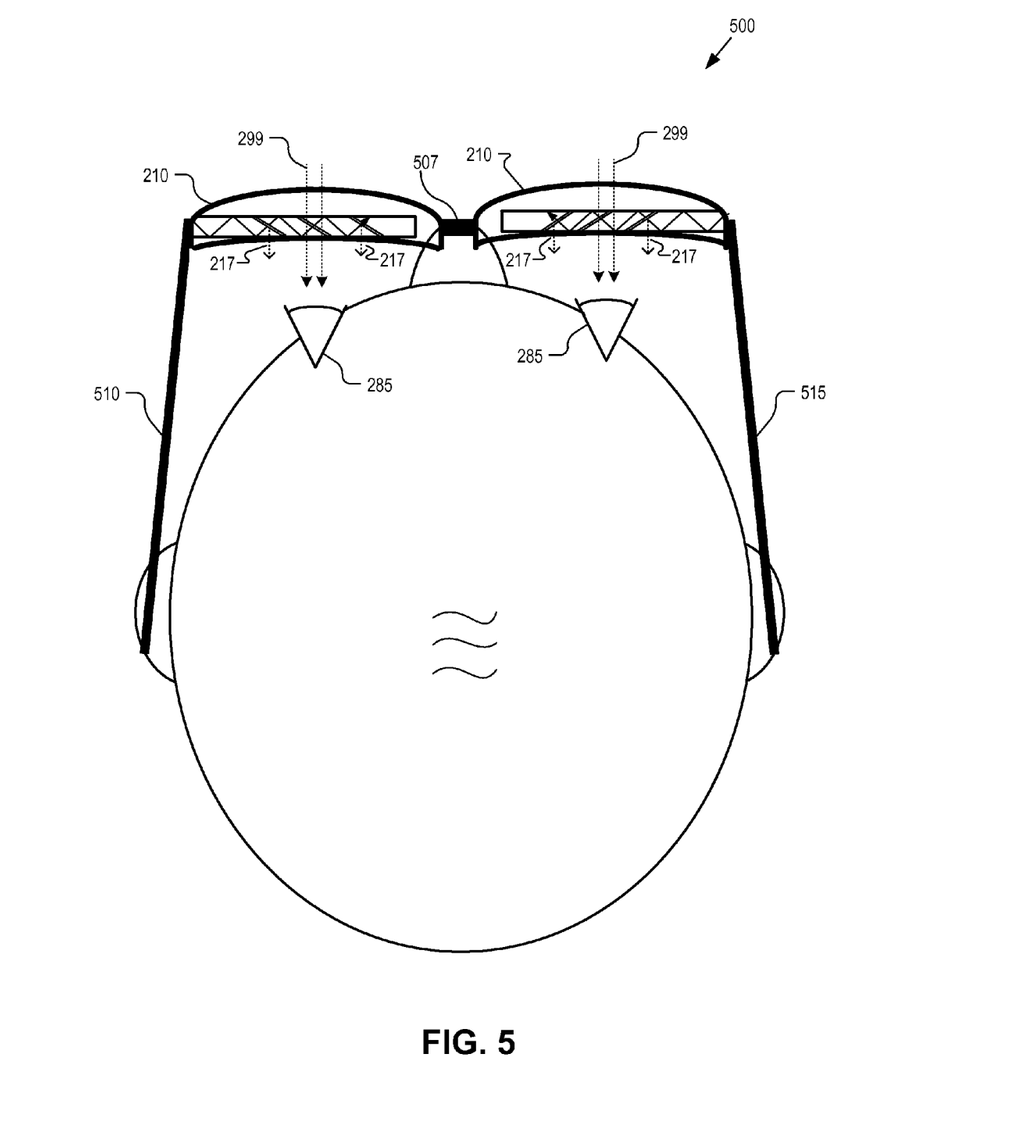
FIG. 5 illustrates a top view of a binocular Head Mounted Display using optical elements that include a holographic lightguide, in accordance with an embodiment of the disclosure.

FIG. 5 illustrates a top view of a binocular HMD 500 using optical elements 210 that each include a holographic lightguide 333, in accordance with an embodiment of the disclosure. Optical elements 210 are mounted to a frame assembly, which includes a nose bridge 507, left temple 510, and right temple 515. The left and right temples 510 and 515 rest over the user's ears while nose bridge assembly 507 rests over the user's nose. The frame assembly is shaped and sized to position each optical element 210 in front of a corresponding eye 285 of the user. Of course, other frame assemblies having other shapes may be used (e.g., a visor with ear arms and a nose bridge support, a single contiguous headset member, a headband, goggles type eyewear, etc.). Although FIG. 5 illustrates a binocular embodiment, HMD 500 may also be implemented as a monocular HMD.

The illustrated embodiment of HMD 500 is capable of displaying an augmented reality to the user via display module 205 and embedded lightguides 333. Additionally, each optical element 210 permits the user to see a real world image via external scene light 299. Outcoupled rays 217 (from display light 207) is seen by the user as a virtual image superimposed over external scene light 299 as an augmented reality.

Considering FIG. 2, FIG. 3, and FIG. 5 together, scene light 299 may travel to an eye of wearer of HMD 500 along an optical path that encounters optical element 210, scene-side hologram 343, propagation region 340, eyeward hologram 345, and optical element 210, in that order. Advantageously, scene light 299 is virtually unaffected by lightguide 333 as it propagates toward eye(s) 285. This is because scene light 299 does not encounter reflection holograms 343 and 345 at the specific angle required for reflection. Therefore, scene light is passed by reflection holograms 343 and 345. Even if some portion of scene light 299 encounters reflection holograms 343 or 345 at the specific angle required for reflection, only a very small spectrum (e.g. 470-475 nm) of scene light 299 would actually be reflected, thus preserving almost all of the color integrity of real world image delivered to eye 285 by scene light 299.

The embodiments discussed above allow prescription lenses to be incorporated into HMDs. Furthermore, embedding lightguide 333 in optical element 210 makes the delivery of display light 207 less susceptible to surface contamination when compared with systems that require TIR. In conventional TIR delivery systems, a fingerprint, dust, or other contaminants on the boundary of the lightguide and the external material (in some cases free space) defeat the intended TIR by outcoupling display light 207 at the site of the contaminant. Similarly, desirable surface coatings such as anti-reflective ("A/R") coating or photochromic coatings may compromise the delivery of display light 207 if the coatings are applied to the boundary of the lightguide. In contrast, in the embodiments disclosed, optical element 210 can have coatings laminated, sprayed on, or dip coated without compromising the delivery of display light 207 because lightguide 333 is embedded in optical element 210 and relies on holographic reflection rather than TIR. This ability adds significant enhancements to user experience of using HMDs as the coatings are used to reduce image aberrations and undesirable optical effects.

Finally, one more potential advantage of the disclosed embodiments is that reflections holograms 343 and 345 may not require the same planar tolerances that a TIR system would require. TIR systems require a smooth planar surface to facilitate TIR because a non-smooth surface would outcouple display light to the extent that the non-smooth surface was somewhat irregular or not flat. However, since the embodiments discussed above rely on the reflection of holograms rather than pure TIR to deliver display light 207, the planar tolerance of propagation region 340 may be somewhat relaxed in some designs, because the holographic features that are defined at exposure form the reflecting plane boundaries, rather than the surface of the lightguide itself. Of course, relaxing tolerances has the added potential benefit of reduced cost and increased manufacturing throughput.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A Head Mounted Display ("HMD") comprising:
   a display module for generating display light; and
   an optical element including an embedded lightguide optically coupled to receive the display light and direct the display light in an eyeward direction, the embedded lightguide including:
      an eyeward hologram configured to reflect a wavelength range of the display light that is incident upon the eyeward hologram at an angle range and configured to pass light that is not incident upon the eyeward hologram within both the wavelength range and the angle range;
      a scene-side hologram configured to reflect the wavelength range of the display light that is incident upon the scene-side hologram at the angle range and configured to pass light that is not incident upon the eyeward hologram within both the wavelength range and the angle range;
      a propagation region disposed between the eyeward hologram and the scene-side hologram; and
      at least one outcoupling element for directing the display light in the eyeward direction, the at least one outcoupling element positioned between the eyeward hologram and the scene-side hologram,
   wherein scene light travels to an eye of a wearer of the HMD along an optical path that encounters the optical element, the scene-side hologram, the propagation region, the eyeward hologram, and the optical element, in that order.

2. The HMD of claim 1, wherein a first color, a second color, and a third color make up a large majority of the display light, and wherein the wavelength range includes a first sub-range centered around the first color, a second sub-range centered around the second color, and a third sub-range centered around the third color.

3. The HMD of claim 2, wherein the first color is red, the second color is green, and the third color is blue.

4. The HMD of claim 2, wherein each of the first sub-range, the second sub-range, and the third sub-range are separated from each other by at least 30 nm.

5. The HMD of claim 2, wherein at least one of the scene-side hologram or the eyeward hologram is a stacked hologram that includes a second hologram disposed between a first hologram and a third hologram, and wherein the first, second, and third hologram reflect the first, second, and third color, respectively.

6. The HMD of claim 1, wherein the optical element includes a prescription lens for correcting eye sight of a wearer of the HMD.

7. The HMD of claim 1, wherein the optical element and the propagation region have a same index of refraction.

8. The HMD of claim 1 further comprising a frame assembly for supporting the display module and positioning the optical element in front of an eye of a wearer of the HMD.

9. The HMD of claim 1, wherein the at least one outcoupling element is partially transparent.

10. The HMD of claim 1, wherein the embedded lightguide is embedded in an upper portion of the optical element that will be out of a straight-ahead line-of-sight of a wearer of the HMD.

11. The HMD of claim 10, wherein the at least one outcoupling element is positioned to direct the display light at a downward tilt toward an eye of the wearer.

12. An optical element for a Head Mounted Display ("HMD"), the optical element comprising:
    a lightguide embedded in the optical element and optically coupled to receive display light and direct the display light in an eyeward direction, the lightguide including:
       an eyeward hologram configured to reflect a wavelength range of the display light that is incident upon the eyeward hologram at a first angle;
       a scene-side hologram configured to reflect the wavelength range of the display light that is incident upon the scene-side hologram at the first angle;

a propagation region disposed between the eyeward hologram and the scene-side hologram, wherein the eyerward hologram and the scene-side hologram each extend across either side of the propagation region such that external scene light passing through the propagation region alond the eyeward direction passes through both of the scene-side hologram and the eyeward hologram; and at least one outcoupling element for directing the display light in the eyeward direction, the at least one outcoupling element positioned between the eyeward hologram and the scene-side hologram.

13. The optical element of claim 12, wherein a first color, a second color, and a third color make up a large majority of the display light, and wherein the wavelength range includes a first sub-range centered around the first color, a second sub-range centered around the second color, and a third sub-range centered around the third color.

14. The optical element of claim 13, wherein the first color is red, the second color is green, and the third color is blue.

15. The optical element of claim 13, wherein each of the first sub-range, the second sub-range, and the third sub-range are separated from each other by at least 30 nm.

16. The optical element of claim 13, wherein at least one of the scene-side hologram or the eyeward hologram is a stacked hologram that includes a second hologram disposed between a first hologram and a third hologram, and wherein the first, second, and third hologram reflect the first, second, and third color, respectively.

17. The optical element of claim 12, wherein the optical element includes a prescription lens for correcting eye sight.

18. The optical element of claim 12, wherein the optical element and the propagation region have a same index of refraction.

19. The optical element of claim 12, wherein all surfaces of the lightguide are surrounded by the optical element.

* * * * *